Sept. 27, 1927. 1,643,680
H. R. SCHUTZ
MANUFACTURE OF SHEET GLASS
Filed Dec. 27, 1926 2 Sheets-Sheet 1
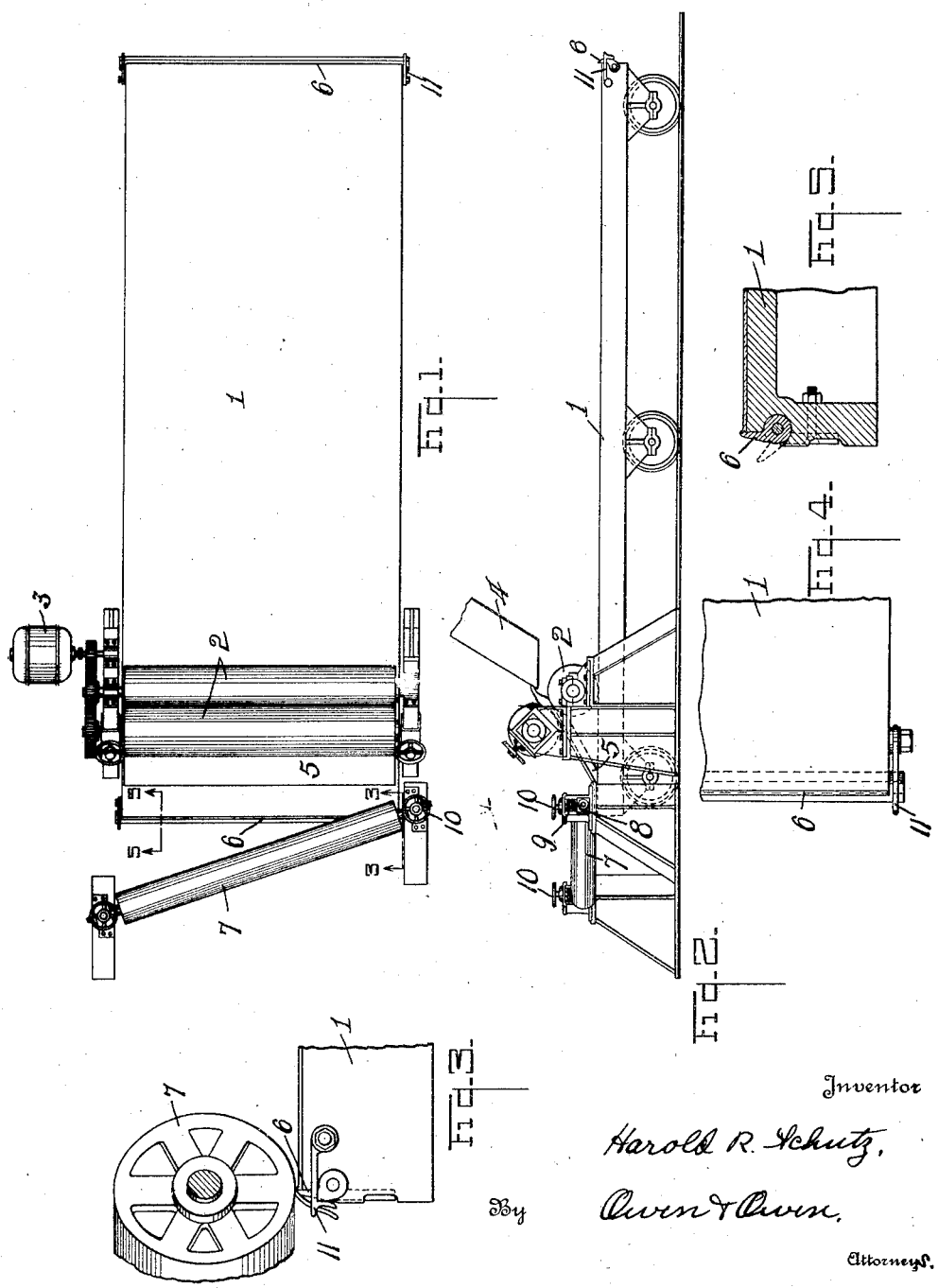

Sept. 27, 1927. 1,643,680
H. R. SCHUTZ
MANUFACTURE OF SHEET GLASS
Filed Dec. 27, 1926 2 Sheets-Sheet 2
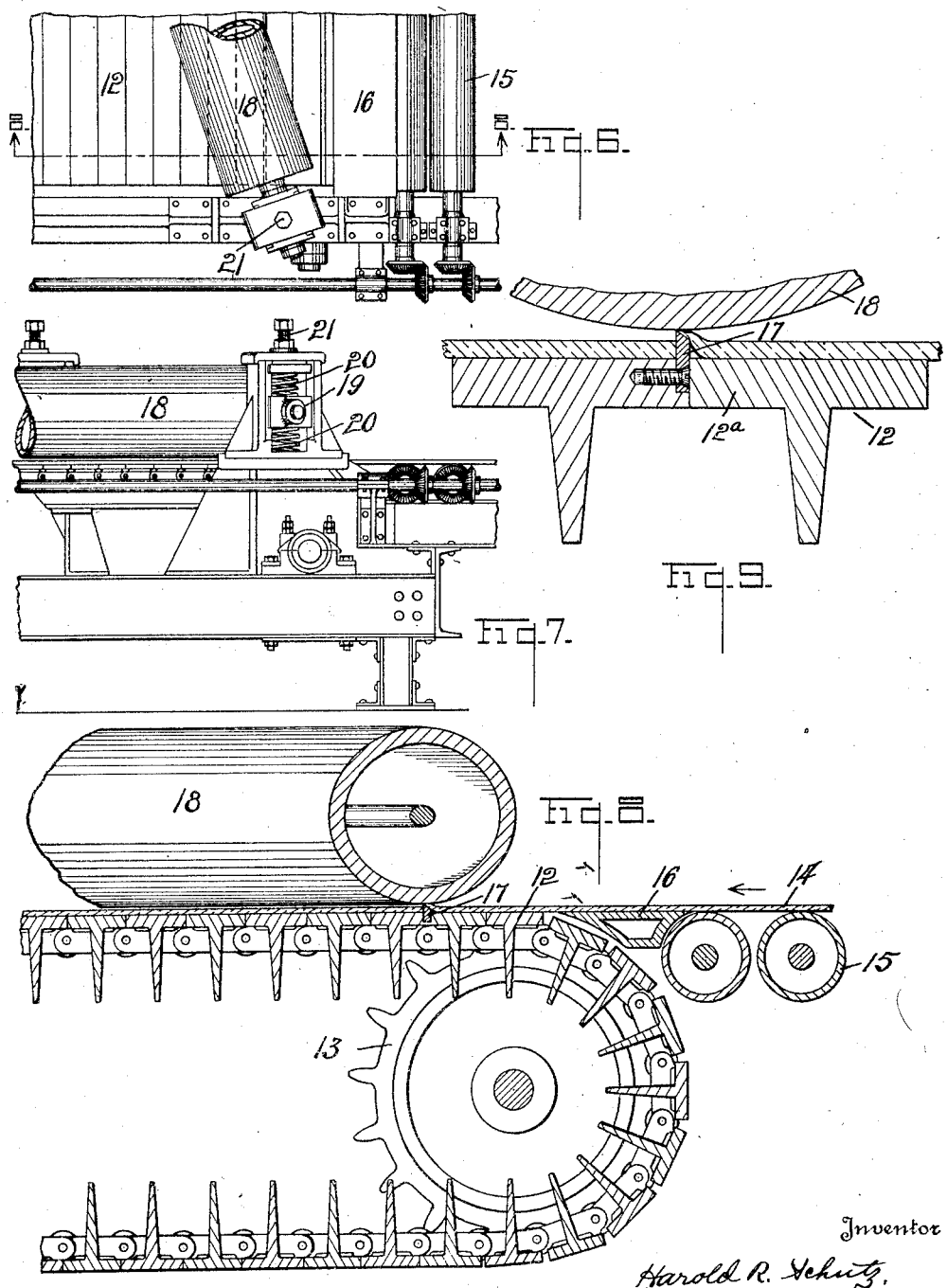
Inventor
Harold R. Schutz,
By Owen & Owen
Attorney Patented Sept. 27, 1927.

1,643,680

UNITED STATES PATENT OFFICE.

HAROLD R. SCHUTZ, OF TOLEDO, OHIO, ASSIGNOR TO THE EDWARD FORD PLATE GLASS COMPANY, OF ROSSFORD, OHIO, A CORPORATION OF OHIO.

MANUFACTURE OF SHEET GLASS.

Application filed December 27, 1926. Serial No. 157,055.

This invention relates to the manufacture of sheet glass, either in plate or continuous sheet form and particularly to the severing of the same in predetermined lengths or trimming the ends thereof adjacent to the forming source, or while the glass is still in a soft or unset condition.

The object of the invention is the provision of a simple and efficient means, which is operable in conjunction with a movable support or table by which the glass is carried away from the sheet forming source, to sever the sheet into sections of predetermined length or to trim the ends of formed lengths or sections. Considerable difficulty has been experienced in trimming or severing a glass sheet during the forming operation so as to form true ends cut at the desired angle before the glass passes into the leer for annealing, and while several methods have been employed for this purpose, none of them, so far as I am aware, has been entirely satisfactory.

The invention is fully described in the following specification, and two embodiments thereof illustrated in the accompanying drawings, in which,—

Figure 1 is a plan view of an apparatus embodying one form of the invention wherein the sheet glass passes from the forming source onto a table or truck form of conveyor. Fig. 2 is a side elevation thereof with molten glass being poured between the sheet forming rolls. Fig. 3 is an enlarged fragmentary section on the line 3—3 in Fig. 1. Fig. 4 is an enlarged plan view of a corner portion of the table with the associated glass severing knife. Fig. 5 is an enlarged vertical fragmentary section of an end of the table. Fig. 6 is a fragmentary plan view of a different form of the invention employing an endless type of conveyor for use in connection with the continuous forming of sheet glass. Fig. 7 is a fragmentary side elevation thereof. Fig. 8 is an enlarged section on the line 8—8 in Fig. 6, and Fig. 9 is a fragmentary enlargement of a portion of Fig. 8 showing the severing means.

Referring to Figs. 1 to 5 of the drawings, 1 designates a movable table or truck having a flat top and adapted to be moved lengthwise under a sheet-forming source and to receive, on its top, the sheet as it advances from the forming source, the movement of the table corresponding to the forming and advancing speed of the sheet. The sheet forming source, in the present instance, comprises a pair of rolls 2 which are geared together and driven in unison by a motor 3, the molten glass being supplied therebetween from a container 4 or other suitable source of supply, as well understood in the art. The formed sheet emerging from between the rolls may pass down a slide 5 to the top of the table 1.

The table 1 is provided, in the present instance, across each end with a knife 6, the upper edge of which projects above the surface of the table a distance preferably slightly greater than the thickness of the sheet being formed. The inner side of the knife is straight in a plane at right angles to the table surface and terminates at its free or outer edge in a cutting edge. The table receives the feeding sheet in such manner that the forward edge portion of the sheet hangs slightly over the front knife of the table and the rear end or edge portion of the sheet extends over the rear knife.

A roll 7 is positioned slightly in advance of the point where the sheet passes onto the table from the supply source and is adapted to have rolling coaction with the upper or cutting edge of each knife 6 as it passes thereunder to cooperate with the knife to effect a trimming or severing of the sheet. The roll 7 is placed at an oblique angle with respect to the knife, so that the glass is gradually, instead of suddenly, sheared off as it passes under the roll. The roll exerts a yielding pressure against the knife by reason of its end bearing bosses 8 being mounted for vertical movements and being acted on by pressure springs 9, the tension of which is adjusted by hand screws 10.

The knives 6 are preferably pivotally mounted to the table ends to adapt them to be thrown to inoperative position when desired. Latches 11 pivoted to the sides of the table 1 engage the ends of the knives to hold them in operative position.

Another form of the invention is illustrated in Figs. 6 to 9 wherein an endless type of conveyor, such as is commonly used for advancing a continuous supply of sheet glass from a forming source, is employed. The receiving end of the conveyor is sufficiently close to the forming source for the glass to still be soft or unset as it passes thereon.

In this form 12 designates the flexible endless conveyor belt passing around suitable guide means and driven at one end by one or more sprocket wheels 13. The sheet glass 14 passes, in the present instance, over guide rolls 15 and a stationary table part 16 before passing onto the conveyor.

The conveyor is provided with one or more suitably spaced knives or shearing bars 17, each secured, in the present instance, along an edge of a cross section or link member 12ª of the conveyor belt with its cutting edge projecting a distance above the outer flat surface of the belt, which is preferably greater than the thickness of the sheet to be severed. A pressure roll 18 for rolling coaction with the cutting edge of the knife 17 is mounted over the receiving end portion of the conveyor belt, being supported by vertically floating end bearing bosses 19 interposed betwen upper and lower tension springs 20. The tension of these springs is adjusted by screws 21 to vary the sheet severing coaction of the roller 18 with the knife or knives 17. The only difference between this form of the invention and that first described, is that the severing bar or knife in one case is carried by a flat table or truck form of conveyor, while in the other case it is carried by an endless type of conveyor. In either case, the pressure roll is intended to have sheet severing coaction with the associated knife at a point adjacent to the sheet forming source so that the glass is still soft after the severing takes place.

I wish it understood that the invention is not limited to any specific construction, arrangement or form of the parts, as it is capable of numerous modifications and change without departing from the spirit of the claims, and also that the term "sheet glass" as used herein is not restricted to the technical meaning of sheet glass, but includes plate and other forms of glass that are delivered in sheet form from a source of supply to a conveyor means.

Having thus described my invention, what I claim as new and desire to secure by Letters Patent is:

1. In combination, a conveyor for receiving sheet glass from a forming source and conveying it away from such source, a severing bar carried by the conveyor crosswise thereof and projecting above its sheet conveying surface, and a roller disposed above the conveyor and adapted to have rolling co-action with the bar as it passes thereunder to cooperate therewith to effect a severing of the sheet before it becomes set, the roller being disposed with its axis oblique to a vertical plane of the cutting edge of the bar so that a point contact of the roller with the bar will be effected with such point progressing from one side edge to the other of the sheet as the conveyor advances.

2. In combination, a conveyor for receiving sheet glass from a forming source and conveying it away from such source, a severing bar pivotally carried by said conveyor and adapted to be swung downwardly to inoperative position or disposed in usable position with its cutting edge projecting above the conveyor surface, means for releasably holding the bar in usable position, and means disposed above the conveyor and adapted to cooperate with said bar when in usable position to effect a severing of the sheet as the conveyor advances and while the sheet is in an unset condition.

In testimony whereof I have hereunto signed my name to this specification.

HAROLD R. SCHUTZ.